United States Patent
Fukumoto et al.

(10) Patent No.: US 8,583,355 B2
(45) Date of Patent: Nov. 12, 2013

(54) ROAD SHAPE ESTIMATING DEVICE, ROAD SHAPE ESTIMATING METHOD AND PROGRAM

(75) Inventors: Masataka Fukumoto, Anjo (JP); Hiroaki Sugiura, Okazaki (JP); Takayuki Toujyou, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 508 days.

(21) Appl. No.: 12/411,907

(22) Filed: Mar. 26, 2009

(65) Prior Publication Data
US 2009/0248290 A1 Oct. 1, 2009

(30) Foreign Application Priority Data
Mar. 28, 2008 (JP) .................................. 2008-087892

(51) Int. Cl.
*G01C 21/00* (2006.01)

(52) U.S. Cl.
USPC ........................................................ 701/206

(58) Field of Classification Search
USPC ........................................................ 701/206
See application file for complete search history.

(56) References Cited

U.S. PATENT DOCUMENTS

| | | | | |
|---|---|---|---|---|
| 6,070,121 A | * | 5/2000 | Matsuda | 701/70 |
| 6,304,818 B1 | * | 10/2001 | Kamiya | 701/520 |
| 6,343,253 B1 | * | 1/2002 | Matsuura et al. | 701/70 |
| 6,385,528 B1 | * | 5/2002 | Takahashi | 701/93 |
| 7,344,288 B2 | * | 3/2008 | Kobayashi et al. | 362/466 |
| 2005/0187705 A1 | * | 8/2005 | Niwa et al. | 701/208 |
| 2005/0246091 A1 | * | 11/2005 | Kuroda et al. | 701/200 |
| 2009/0216415 A1 | * | 8/2009 | Iwatsuki et al. | 701/70 |

FOREIGN PATENT DOCUMENTS

| | | |
|---|---|---|
| DE | 10 2004 006687 A1 | 9/2005 |
| EP | 0 789 225 A1 | 8/1997 |
| EP | 1 086 844 A2 | 9/2000 |
| EP | 1 593 936 A2 | 4/2005 |
| EP | 1 559 994 A2 | 8/2005 |
| JP | 2001101597 | 4/2001 |
| JP | 2005-315695 A | 11/2005 |

* cited by examiner

*Primary Examiner* — Neha Patel
(74) *Attorney, Agent, or Firm* — Bacon & Thomas, PLLC

(57) ABSTRACT

A road shape estimating device has a data obtaining processing unit for obtaining interpolation point data for a plurality of shape interpolation points which are set along a road and represent a shape of the road, a radius calculation processing unit for calculating a radius of curvature at each of the shape interpolation points based on the interpolation point data for a predetermined section of the road, a corner detection processing unit for detecting a corner in the predetermined section based on the radii of curvature, and a corner dividing processing unit for dividing the corner at a shape interpolation point having a radius of curvature equal to or larger than a threshold in the detected corner. The threshold is set corresponding to an average value of radii of curvature at respective shape interpolation points in the detected corner.

4 Claims, 11 Drawing Sheets

FIG. 24
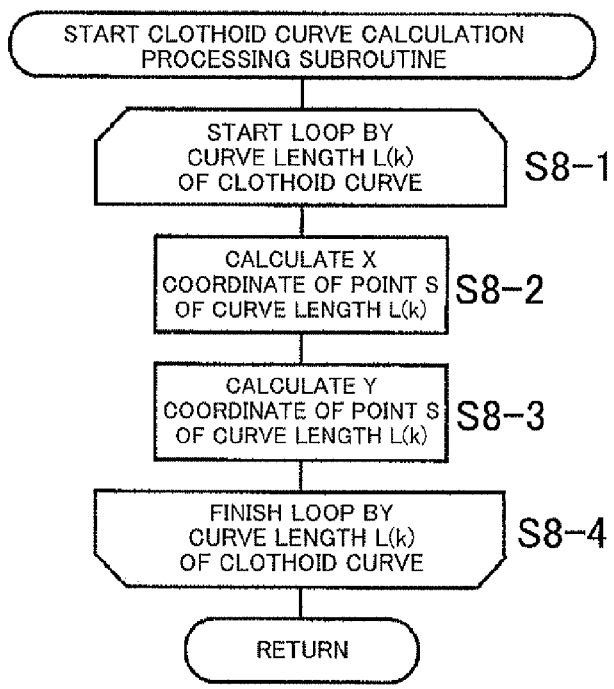
| Rmin | A² |
|---|---|
| 10 | 498 |
| 20 | 732 |
| ⋮ | ⋮ |
| 340 | 11060 |
| 350 | 11088 |
FIG. 25
START CLOTHOID CURVE CALCULATION PROCESSING SUBROUTINE
START LOOP BY CURVE LENGTH L(k) OF CLOTHOID CURVE — S8-1
CALCULATE X COORDINATE OF POINT S OF CURVE LENGTH L(k) — S8-2
CALCULATE Y COORDINATE OF POINT S OF CURVE LENGTH L(k) — S8-3
FINISH LOOP BY CURVE LENGTH L(k) OF CLOTHOID CURVE — S8-4
RETURN
FIG. 26
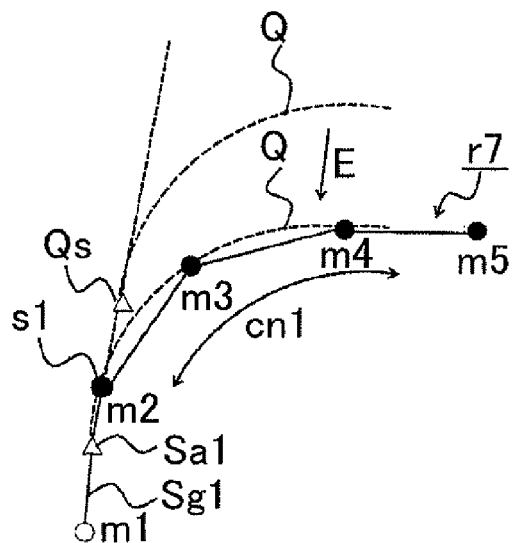

ROAD SHAPE ESTIMATING DEVICE, ROAD SHAPE ESTIMATING METHOD AND PROGRAM

INCORPORATION BY REFERENCE

The disclosure of Japanese Patent Application No. 2008-087892 filed on Mar. 28, 2008 including the specification, drawings and abstract is incorporated herein by reference in its entirety.

BACKGROUND OF THE INVENTION

The present invention relates to a road shape estimating device, a road shape estimating method and a program.

Description of the Related Art

Conventionally in a navigation device, the actual position, namely, the current position of a vehicle is detected for example by a global positioning system (GPS), map data are read from a data recording unit, a map screen is formed on a display unit, and a map or the like of a vehicle position representing the current position and an area surrounding the vehicle position (vicinity) are displayed on the map screen. Therefore, a driver can drive the vehicle according to the vehicle position and the like displayed on the map screen.

Further, when the driver inputs a destination and sets a search condition, route search processing is performed based on the search condition, and a route from the place of departure represented by the current position to the destination is searched for according to the map data. Then the route that has been located by search ("searched route") is displayed together with the vehicle position on the map screen, and guidance on the searched route, namely, namely, route guidance is performed. Therefore, the driver can drive the vehicle along the displayed searched route.

A vehicle control system that changes shift speed of the automatic transmission and/or output of the engine using information obtained by the navigation device, so as to control travel of the vehicle, is known.

A road shape estimating device is provided in the vehicle control system, and a road shape is estimated with the road shape estimating device. Then the road shape estimating device reads road data from a database provided in the data recording unit of the navigation device so as to obtain interpolation point data regarding interpolation points set for representing a road shape by a plurality of points in the database, namely, shape interpolation points. The road shape estimating device then calculates the radius of curvature (hereinafter, simply referred to as "radius") of the road between shape interpolation points by means of three-point calculation method, detects and sets a corner in the database based on each radius, and sets a candidate start point representing a start point of the corner and sets a candidate end point representing an end point of the corner. Further, the road shape estimating device corrects the positions of the candidate start point and the candidate end point based on a clothoid curve expressed by an approximate expression of the corner, estimates the road shape, and records the corrected positions of the candidate start point and the candidate end point as data representing the road shape in the recording unit (refer to, for example, Japanese Patent Application Publication No. JP-A-2005-214839).

SUMMARY OF THE INVENTION

In the conventional road shape estimating device, however, depending on the manner in which the setting shape interpolation points are set in the database, it is possible that corners that should be regarded as a plurality of corners on the actual road are detected as one corner and, consequently, the road shape cannot be estimated precisely.

It is an object of the present invention to solve the problem of the conventional road shape estimating device, and to provide a road shape estimating device, a road shape estimating method and a program which are capable of estimating a road shape precisely.

To achieve this object, a road shape estimating device according to the present invention includes a data obtaining processing unit for obtaining interpolation point data of a plurality of shape interpolation points which are set along a road and represent a shape of the road, a radius calculation processing unit for calculating a radius of curvature at each of shape interpolation points based on the interpolation point data in a predetermined section of the road, a corner detection processing unit for detecting a corner in the predetermined section based on the radius of curvature at each of the shape interpolation points, and a corner dividing processing unit for setting a threshold corresponding to an average value of radii of curvature at respective shape interpolation points in the detected corner and for dividing the corner at a shape interpolation point having, in the detected corner, a radius of curvature equal to or larger than the threshold.

According to the present invention, dividing of a corner is performed at a shape interpolation point having a radius of curvature in a detected corner equal to or larger than a threshold. Thus, even if precision of the interpolation point data in a database is low and a predetermined shape interpolation point is set deviating from a straight line in a straight section of a corner, the corner can be divided appropriately. Therefore, corners that should be regarded as a plurality of corners will not be regarded as one corner in the database, and thus the road shape can be estimated precisely.

BRIEF DESCRIPTION OF THE DRAWINGS

FIG. 24 is a clothoid coefficient map which can be utilized in the embodiment of FIGS. 1A and 1B;

FIG. 25 is a flowchart of a subroutine of clothoid curve calculation processing in the embodiment of FIGS. 1A and 1B; and FIG. 26 is an explanatory diagram of fitting processing in the embodiment of FIGS. 1A and 1B.

DESCRIPTION OF THE PREFERRED EMBODIMENTS

Hereinafter, a preferred embodiment of the present invention will be explained with reference to the drawings.

Figure 1A:
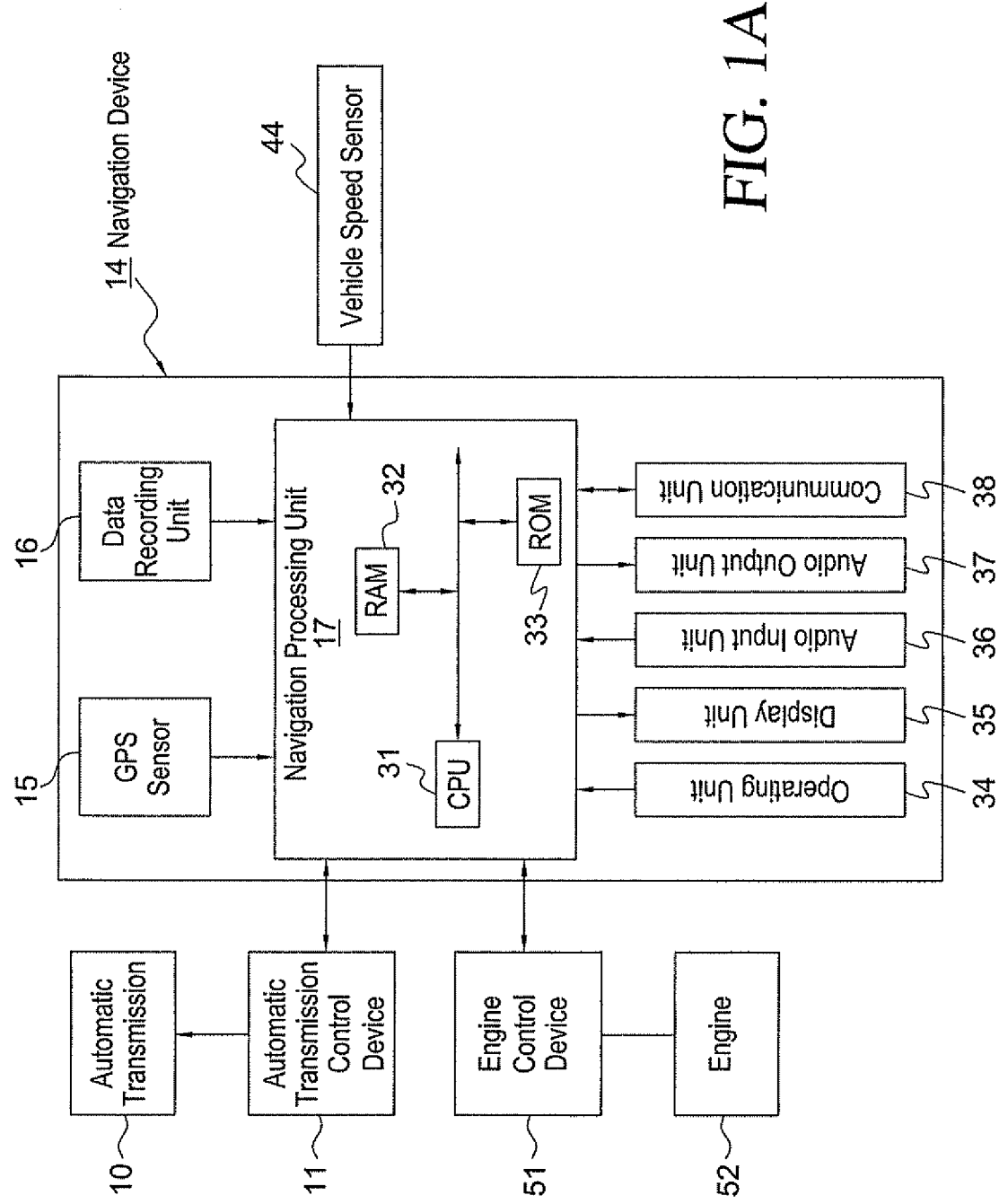
FIG. 1A is a block diagram of a vehicle control system of an embodiment of the present invention.
Figure 2:
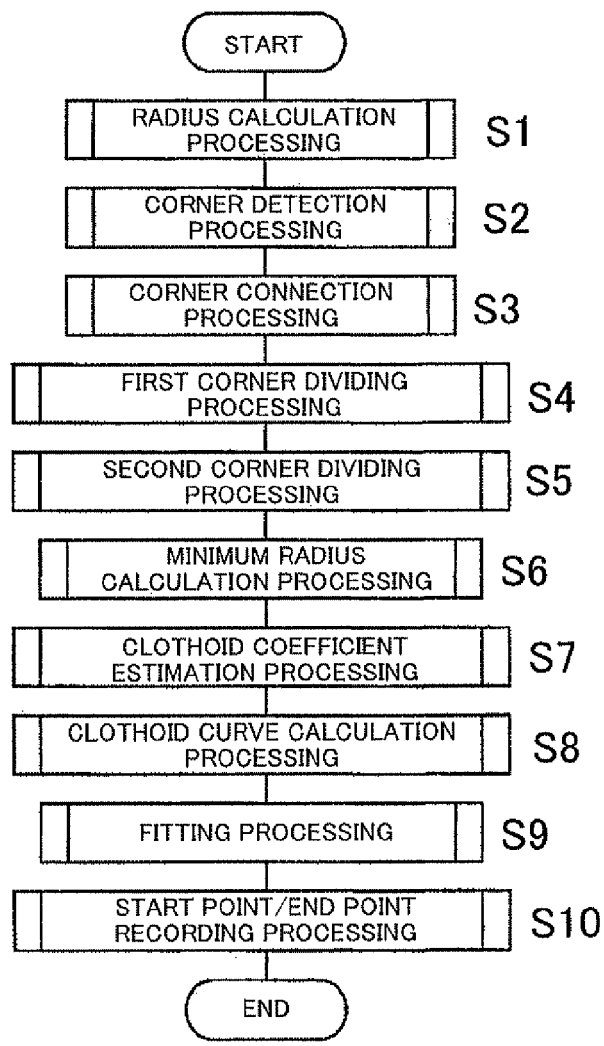
FIG. 2 is a main flowchart of operation of a road shape estimation processing device in the embodiment of FIGS. 1A and 1B.

FIG. 1A is a block diagram of a vehicle control system in the preferred embodiment, and FIG. 2 is a main flowchart of operation of a road shape estimation processing unit in the preferred embodiment.

In FIG. 1A, numeral 14 denotes an information terminal, for example, a navigation device as an on-board device mounted in a vehicle, and the navigation device 14 includes a OPS sensor 15 as a current position detecting unit which detects the current position of the vehicle as a vehicle position and the direction of the vehicle as a vehicle direction, a data recording unit 16 as an information recording unit in which various information besides map data (not shown) is recorded, a navigation processing unit 17 for executing various processes such as navigation processing, an operation unit 34 as a first input unit with which a driver (operator) inputs various information and commands, a display unit 35 as a first output unit for displaying images on a screen (not shown) for informing the driver, an audio input unit 36 as a second input portion with which the driver provides input by voice, an audio output unit 37 as a second output unit for performing audio output to inform the driver of various information, and a communication unit 38 as a transmission/reception unit functioning as a communication terminal. The GPS sensor 15, data recording unit 16, operation unit 34, display unit 35, audio input unit 36, audio output unit 37 and communication unit 38 are connected to the navigation processing unit 17. Further, a vehicle speed sensor 44 or the like (vehicle speed detecting unit) which detects vehicle speed is connected to the navigation processing unit 17. The GPS sensor 15 detects time in addition to the vehicle position and the vehicle direction. Note that it is also possible to provide a direction sensor (not shown) independently from the GPS sensor 15 for detecting the vehicle direction with the direction sensor.

In the data recording unit 16, a database constituted of a map data file is provided, and map data are recorded in the database. The map data include road data regarding roads connecting intersections (including branch points), node data regarding nodes representing end points (start points and end points) of the roads, intersection data regarding the intersections, search data processed for searching, facility data regarding facilities, and the like, as well as feature data regarding features on the road. Further, the road data include data representing road links from start points to end points of the roads in the database, and data for shape interpolation points (hereinafter referred to as "interpolation point data") as a plurality of set points which are set along roads for representing road shapes on the road links. The interpolation point data include the numbers, coordinates, and the like of the shape interpolation points. Note that each node represents a start point or end point on a road link, and hence is also a shape interpolation point.

Furthermore, in the data recording unit 16, a database constituted of a statistical data file, a database constituted of a traveling history data file, and the like are provided. Statistical data are recorded in the statistical data file, and travel history data are recorded in the travel history data file, both as actual data.

The data recording unit 16 includes a disk (not shown) such as a hard drive, CD, DVD or optical disk for recording the various aforementioned data, and further includes a head (not shown) such as a reading/writing head for reading or writing various data. Further, a memory card or the like can be used for the data recording unit 16.

The navigation processing unit 17 has a CPU 31 as a control device performing overall control of the navigation device 14 and as an arithmetic unit, a RAM 32 used as a working memory when the CPU 31 performs various arithmetic processing, a ROM 33 in which various programs for performing a search of route to a destination, route guidance, and the like are recorded besides a control program, a flash memory (not shown) used for recording various data and programs, and the like.

As the operation unit 34, a keyboard (not shown), mouse, and/or the like provided independently from the display unit 35 can be used. Further, as the operation unit 34, it is possible to use a touch panel which allows a predetermined input operation by touching or clicking image operation units such as various keys, switches, buttons, and the like which are displayed by images on a screen formed on the display unit 35.

The display unit 35 displays on various screens, the vehicle position, vehicle direction and the like, as well as a map, a searched route, guidance information along the searched route, traffic information, and so on, and the distance to the next intersection on the searched route and a traveling direction at the next intersection.

Further, the audio input unit 36 is structured from a microphone (not shown) or the like, and is able to input necessary information by voice. Furthermore, the audio output unit 37 includes an audio synthesis device (not shown) and a speaker (not shown), and performs route guidance of the searched route by audio output.

The communication unit 38 includes a beacon receiver (not shown) for receiving various information such as current traffic information and general information transmitted from a vehicle information and communication system center, a FM receiver (not shown) for receiving the various information as an FM multiplex broadcast via an FM broadcast station, and so on. Further, the communication unit 38 is able to receive data such as map data, statistical data, and traveling history data besides information such as traffic information and general information via a network (not shown) from an information center (not shown).

Note that the navigation processing unit 17, CPU 31, and so on function as a computer independently or in combination of two or more, and performs arithmetic processing based on various programs, data, and the like. Further, the data recording unit 16, RAM 32, ROM 33, flash memory, and so on form a storage device and a recording medium. As the arithmetical unit, an MPU or the like can be used instead of the CPU 31.

Note that numeral 10 denotes an automatic transmission, numeral 11 denotes an automatic transmission control device, numeral 51 denotes an engine control unit, and numeral 52 denotes an engine.

Next, a basic operation of the navigation device 14 with the above structure will be explained.

First, the operation unit 34 is operated by the driver and the navigation device 14 is started, a current position reading processing unit (not shown) of the CPU 31 performs current position reading processing so as to read the vehicle position and the vehicle direction detected by the CPS sensor 15. Then a matching processing unit (not shown) of the CPU 31 performs matching processing and identifies the vehicle position by determining on which of the road links the vehicle is located based on the trace of the read vehicle position, and shapes, arrangements, and the like of road links forming roads in the surrounding area of the vehicle position.

Subsequently, a basic information obtaining processing unit (not shown) of the CPU 31 performs basic information obtaining processing to read and obtain the map data from the data recording unit 16. Note that the map data can be obtained from the information center or the like, and in this case, the basic information obtaining processing unit downloads the received map data into the flash memory.

A display processing unit (not shown) of the CPU 31 performs display processing to form various screens on the display unit 35. For example, a map display processing unit of the display processing unit performs map display processing to form a map screen on the display unit 35 so as to display a surrounding map and farther display the vehicle position and the vehicle direction on the map screen.

Therefore, the driver can drive the vehicle according to the surrounding map, the vehicle position and the vehicle direction.

Further, when the driver inputs a destination through the operation unit 34, a destination setting processing unit (not shown) of the CPU 31 performs destination setting processing to set the destination. Note that a place of departure can be inputted and set as necessary. Further, it is possible to register a predetermined point in advance, and set the registered point as a destination. Subsequently, when the driver inputs a search condition by operating the operation unit 34, a search condition setting processing unit (not shown) of the CPU 31 performs search condition setting processing to set the search condition.

When the destination and the search condition are set in this manner, a route search processing unit (not shown) of the CPU 31 performs route search processing to read the vehicle position, vehicle direction, destination, search condition and the like and also read the search data and the like from the data recording unit 16, search for a route from a place of departure represented by the vehicle position to the destination with the search condition based on the vehicle position, vehicle direction, destination, search data, and the like, and output route data representing a searched route. At this time, in the route search processing, the route having a smallest sum of link costs added respectively to road links is taken as the searched route. Note that the place of departure can also be a predetermined point set by the driver instead of the vehicle position, so as to search for a route from the predetermined point to the destination.

Subsequently, a guidance processing unit (not shown) of the CPU 31 performs guidance processing to provide route guidance. For this purpose, a guidance display processing unit of the guidance processing unit performs guidance display processing to read the route data and display the searched route on the map screen based on the route data.

Note that when it is necessary, for example, to turn the vehicle to the right or left at an intersection that is a point serving as a subject of route guidance, the intersection is set as a guidance intersection as a subject of performing guidance on direction to advance the vehicle. An audio output processing unit of the guidance processing unit then performs audio output processing to perform the route guidance by audio output before the vehicle reaches the guidance intersection.

Further, a guidance point enlarged view formation processing unit of the guidance processing unit performs guidance point enlarged view formation processing to form, in a predetermined region of the map screen, an enlarged view of the guidance intersection, namely, an intersection enlarged view, a type of guidance point enlarged view, before the vehicle reaches the guidance intersection, and thereby provides route guidance with the intersection enlarged view For this purpose, when the vehicle reaches a location that is separated by a set distance in advance of (or on the vehicle position side of) the guidance intersection on the searched route, the intersection enlarged view is displayed. In this case, a map of the vicinity of the guidance intersection, the searched route, and a landmark, e.g. facility or the like, at the guidance intersection are displayed on the intersection enlarged view.

Now, in this embodiment, information obtained in the navigation device 14 is transmitted to the automatic transmission control device 11 so as to change the shift speed of the automatic transmission 10 in accordance with the road shape ahead of the vehicle position, or transmitted to the engine control device 51 so as to change the output of the engine 52 in accordance with the road shape ahead of the vehicle position, thereby controlling travel of the vehicle.

For this purpose, the CPU 31 functions as a road shape estimating device, and a road shape estimation processing unit 311 of the CPU 31 performs road shape estimation processing so as to estimate the road shape by a method which will be described later. A traveling control processing unit (not shown) of the CPU 31 performs traveling control processing to transmit a signal for changing the shift speed of the automatic transmission 10 and/or changing the output of the engine 52 according to the estimated road shape to the automatic transmission control device 11, the engine control device 51, or the like.

Next, operation of the road shape estimation processing unit will be explained with reference to FIG. 2.

First, a data obtaining processing unit 3111 of the road shape estimation processing unit 311 executes data obtaining processing to set a predetermined region ahead of the vehicle position, including the road for which a road shape is to be estimated, as a road shape estimation range, reads road data from the data recording unit 16, and obtains node data within the road shape estimation range.

In this case, within the road shape estimation range, estimation of road shape is performed in sequence of road links between nodes adjacent to each other from the first node to the last node among the nodes represented by the node data. Note that in this case, each road link for which a road shape is to be estimated in the database is referred to as a shape estimation road.

Then, for performing estimation of a road shape for each shape estimation road, the data obtaining processing unit 3111 obtains interpolation point data for shape interpolation points on the shape estimation road ahead of the vehicle position. Note that in this embodiment, the data obtaining processing unit obtains the node data and the interpolation point data by reading them from the data recording unit 16, but they can also be obtained by receiving via a network from the information center.

Next, a radius calculation processing unit 3112 of the road shape estimation processing unit 311 performs radius calculation processing to calculate a radius (radius of curvature) at each shape interpolation point of the shape estimation road by three-point calculation method based on the interpolation point data of shape interpolation points on the shape estimation road ahead of the vehicle position. Subsequently, a corner detection processing unit 3113 of the road shape estimation processing unit 311 executes corner detection processing to detect a corner in the shape estimation road in the database, based on the radius, and sets, in the database, a shape interpolation point where the corner starts as a candidate start point, and a shape interpolation point where the corner ends as a candidate end point.

When a corner that should be regarded as one corner on the actual road is detected as a plurality of corners, depending on the manner of setting the shape interpolation points in the database, a corner connection processing unit 3114 of the road shape estimation processing unit 311 then executes corner connection processing so as to connect the detected corners.

Next, when corners that should be regarded as a plurality of corners on the actual road are detected as one corner, due to the fact that a shape interpolation point is not set in a straight section between corners or the fact that a shape interpolation point has a radius that is equal to or smaller than a threshold value for corner detection, which will be described later, first and second corner dividing processing units 3114, 3115 of the road shape estimation processing unit 311 execute first and second corner dividing processes to divide the detected corner. In this case, in the first corner dividing process, the detected corner is divided when a predetermined shape interpolation point in the corner has a radius that is equal to or larger than a threshold serving as the first dividing process condition, and in the second corner dividing process, the detected corner is divided when a segment between predetermined shape interpolation points in the corner has a length that is equal to or longer than a threshold serving as a second dividing process condition.

In this manner, when connection of corners or dividing of a corner is performed to set an appropriate corner based on shape interpolation points, a minimum radius calculation processing unit 3120 of the road shape estimation processing unit 311 executes a minimum radius calculation process to calculate an appropriate minimum radius for estimating a clothoid coefficient for each corner.

Subsequently, a clothoid coefficient estimation processing unit 3116 of the road shape estimation processing unit 311 executes a clothoid coefficient estimation process to estimate a clothoid coefficient based on the minimum radius. A clothoid curve calculation unit 3117 of the road shape estimation processing unit 311 executes a clothoid curve calculation process to form an equation approximating the corner based on the clothoid coefficient and to calculate a clothoid curve.

In this manner, when the clothoid curve representing the road shape of the corner is calculated, a fitting processing unit 3118 of the road shape estimation processing unit 311 executes a fitting process to correct the candidate start point and the candidate end point by matching the clothoid curve with the respective shape interpolation points on the corner, and thereby sets the start point and the end point of the corner at positions approximating a point where the corner starts and a point where the corner ends on the actual road.

Then a start point/end point recording unit 3119 of the road shape estimation processing unit 311 executes a start point/end point recording process to record the start point and the end point as data representing the road shape in the data recording unit 16. In this manner, the road shape is estimated.

Next, the flowchart of FIG. 2 will be explained.

In step S1, the radius calculation processing is performed.
In step S2, the corner detection processing is performed.
In step S3, the corner connection processing is performed.
In step S4, the first corner dividing processing is performed.
In step S5, the second corner dividing processing is performed.
In step S6, the minimum radius calculation processing is performed.
In step S7, the clothoid coefficient estimation processing is performed.
In step S8, the clothoid curve calculation processing is performed.
In step S9, the fitting processing is performed.
In step S10, the start point/end point recording processing is performed, and the processing is finished.

Figure 3:
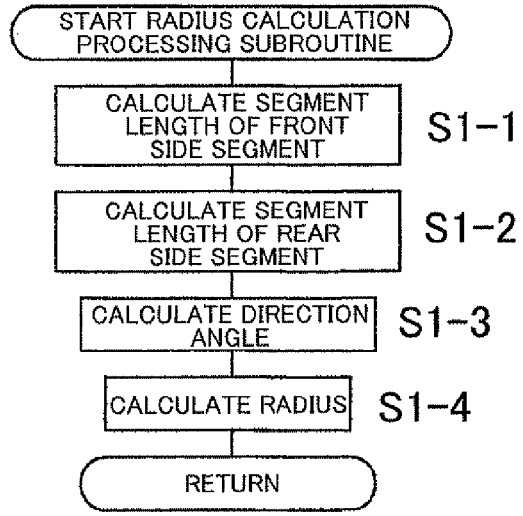
FIG. 3 is a flowchart of a subroutine for radius calculation in the embodiment of FIGS. 1A and 1B.

Next, the subroutine of the radius calculation processing in step S1 of FIG. 2 will be explained with reference to FIGS. 3 and 4.

Figure 4:
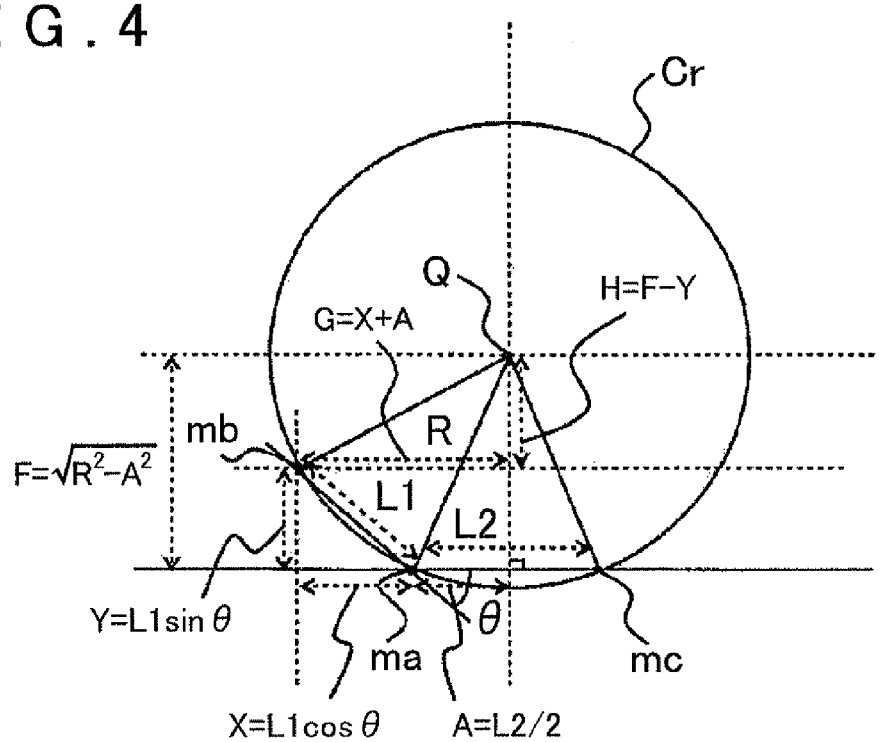
FIG. 4 is a diagram explaining the principle of calculating a radius.

As shown in FIG. 4, a shape interpolation point to be a target of radius calculation processing is designated as target point ma, a shape interpolation point that is located immediately preceding the target point ma (on the vehicle position side) is designated as preceding adjacent point mb, and a shape interpolation point that is located immediately succeeding the target point ma (on the side of point ma opposite the vehicle position) is designated as succeeding adjacent point mc. The segment length of a segment on a side nearer than the target point ma (hereinafter referred to as "front side segment") that connects the target point ma and the preceding adjacent point mb is designated as L1, and the segment length of a segment on a side farther than the target point ma (hereinafter referred to as "rear side segment") that connects the target point ma and the succeeding adjacent point mc is designated as L2. Further, with the circle passing through the target point ma, the preceding adjacent point mb and the succeeding adjacent point mc is designated as Cr, the center of the circle Cr is designated as Q and the radius of the circle Cr is designated as R. Furthermore, at the target point ma, the angle which the rear side segment forms with respect to the front side segment is designated as direction angle $\theta$.

A direction to connect the target point ma and the succeeding adjacent point mc is x-axis direction and a direction at a right angle with respect to the x axis direction is y-axis direction, and when the distance between the target point ma and the preceding adjacent point mb in the x-axis direction is designated as X, the distance between the target point ma and the center Q in the x-axis direction is designated as A, the distance between the preceding adjacent point mb and the center Q in the x-axis direction is designated as C, the distance between the target point ma and the preceding adjacent point mb in the y-axis direction is Y, the distance between the preceding adjacent point mb and the center Q in the y-axis direction is designated as X, and the distance between the target point ma and the center Q on the y-axis direction is designated as F, following equations hold true:

$$X = L1 \cos \theta$$

$$A = L2/2$$

$$G = X + A$$

$$Y = L1 \sin \theta$$

$$F = \sqrt{(R^2 - A^2)}$$

$$H = F - Y$$

In this case, the sum of the square of the distance G and the square of the distance H is equal to the square of the radius R, and thus the relationship of equation (1) is satisfied.

$$R^2 = G^2 - H^2 \qquad (1)$$

Next, by substituting the above respective values into the distances G, H of the equation (1), following equation (2) can be obtained.

$$R^2 = X^2 + 2XA + A^2 + R^2 - A^2 - 2Y\sqrt{(R^2 - A^2)} + Y^2 \qquad (2)$$

Subsequently, by modifying the equation (2), equations (3) to (6) can be obtained.

$$2Y\sqrt{(R^2 - A^2)} = X^2 + Y^2 + 2XA \qquad (3)$$

$$R^2 - A^2 = \{(X^2 + Y^2 + 2XA)/2Y\}^2 \qquad (4)$$

$$R^2 = \{(X^2 + Y^2 + 2XA)/2Y\}^2 + A^2 \qquad (5)$$

$$R^2 = (L1^2 + 2L1 \cdot L2 \cos \theta + L2^2)/(2 \sin \theta)^2 \qquad (6)$$

From the equation (6), it can be seen that the radius R is a function of the segment lengths L1, L2 and the direction angle θ.

Accordingly, the radius calculation processing unit 3112 reads the interpolation point data, calculates the segment lengths L1, L2 based on respective coordinates of the target point ma, the preceding adjacent point mb and the succeeding adjacent point me, and calculates the direction angle θ.

Subsequently, the radius calculation processing unit 3112 calculates the radius R of the circle Cr by aforementioned equation (6) based on the segment lengths L1, L2 and the direction angle θ. In this manner, the radius R at the target point ma can be calculated on the shape estimation road.

Next, the flowchart of FIG. 3 will be explained.

In step S1-1, the segment length L1 of the front side segment is calculated.

In step S1-2, the segment length L2 of the rear side segment is calculated.

In step S1-3, the direction angle θ is calculated.

In step S1-4, the radius R is calculated and the process returns to the main routine.

Note that in this embodiment, the direction angle θ and the radius R are calculated based on calculations by the radius calculation processing unit 3112, but it is also possible to record a direction angle θ and a radius R, calculated in advance, in the database of the data recording unit 16 as part of the road data, and to perform calculation by reading them from the data recording unit 16.

Next, the corner detection processing in step S2 of FIG. 2 will be explained with reference to FIGS. 5-13.

In the diagrams, ri (i=1, 2, ... ) is a shape estimation road set between two nodes (not shown), mi (i=1, 2, ... ) are a plurality of shape interpolation points set in order from the near side in the travel direction of the vehicle (arrow G direction) along the shape estimation road ri, and θi (i=1, 2, ... ) is a direction angle at each shape interpolation point mi. Note that the direction angle θi is an angle which the rear side segment forms with respect to the front side segment. When the rear side segment is located on the right side in the travel direction of the vehicle with respect to the front side segment, the direction angle θi takes a positive value. When the rear side segment is located on the left side in the travel direction of the vehicle with respect to the front side segment, the direction angle θi takes a negative value.

Figure 5:
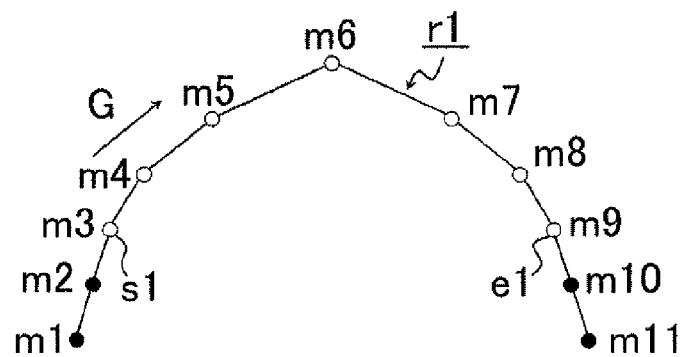
FIG. 5 is a first explanatory diagram of corner detection in the embodiment of FIGS. 1A and 1B.

First, a candidate start point/candidate end point setting processing unit of the corner detection processing unit 3112 executes a candidate start point/candidate end point setting process to read the radius Ri (i=1, 2, ... ) at each shape interpolation point mi, to determine whether the radius Ri is equal to or smaller than a threshold Rth (1000 [m] in this embodiment) for corner detection which is set in advance, and to extract any shape interpolation point with a radius equal to or smaller than the threshold Rth. In FIG. 5, the shape interpolation points m3 to m9 are close to a straight line, and they are determined to be equal to or lower than the threshold Rth and are extracted.

Figure 6:
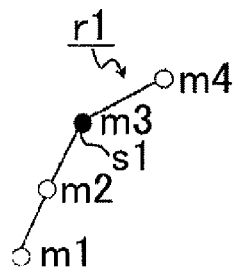
FIG. 6 is a second explanatory diagram of the corner detection in the embodiment of FIGS. 1A and 1B.

Subsequently, the candidate start point/candidate end point setting processing unit determines whether or not there are a plurality of consecutive shape interpolation points (hereinafter referred to as a "consecutive shape interpolation point group") among the extracted shape interpolation points. When there is a consecutive shape interpolation point group, the unit takes the shape interpolation point on the nearest side (vehicle position side) in the consecutive shape interpolation point group as a candidate start point. In FIG. 5 and FIG. 6, the consecutive shape interpolation point group is formed by the shape interpolation points m3 to m9, and the shape interpolation point m3 is taken as the candidate start point s1.

Figure 7:
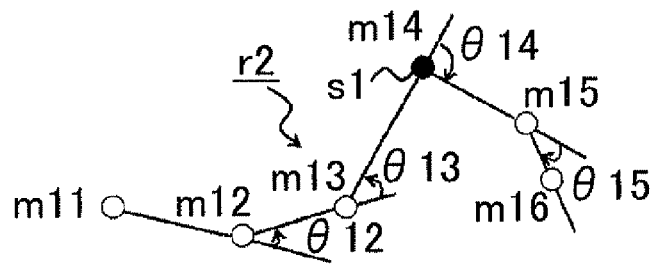
FIG. 7 is a third explanatory diagram of the corner detection in the embodiment of FIGS. 1A and 1B.

Further, the candidate start point/candidate end point setting processing unit reads the direction angles θ, calculated by the radius calculation processing unit 3112 for the extracted shape interpolation points, sequentially from the near side, and determines whether or not the direction angle reverses from positive to negative or from negative to positive at a predetermined shape interpolation point (reverses relative to the immediately preceding shape interpolation point). When the direction angle reverses between positive and negative at the predetermined shape interpolation point, the unit determines whether or not the direction angle reverses at the immediately succeeding shape interpolation point. If the direction angle reverses between positive and negative at the predetermined shape interpolation point but does not reverse at the immediately succeeding shape interpolation point, the predetermined shape interpolation point is taken as the candidate start point. When shape interpolation points m11 to m16 are set on a shape estimation road r2 having a shape as shown in FIG. 7, direction angles θ12 and θ13 have negative values and direction angles θ14 and θ15 have positive values at the shape interpolation points m12 to m15. That is, the direction angle θ14 reverses from negative to positive at the shape interpolation point m14, and of the direction angle θ15 remains positive and does not reverse at the immediately succeeding shape interpolation point m15. Thus, the shape interpolation point m14 is taken as the candidate start point s1.

Figure 8:
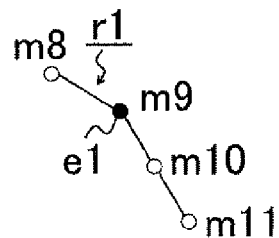
FIG. 8 is a fourth explanatory diagram of the corner detection in the embodiment of FIGS. 1A and 1B.

Next, the candidate start point/candidate end point setting processing unit determines whether or not there is a consecutive shape interpolation point group among the extracted shape interpolation points. When there is a consecutive shape interpolation point group, the unit takes the shape interpolation point on the farthest side (side opposite the vehicle position) in the consecutive shape interpolation point group as a candidate end point. In FIG. 5 and FIG. 8, the consecutive shape interpolation point group is formed by the shape interpolation points m3 to m9, and the shape interpolation point m9 is taken as the candidate end point e1.

Figure 9:
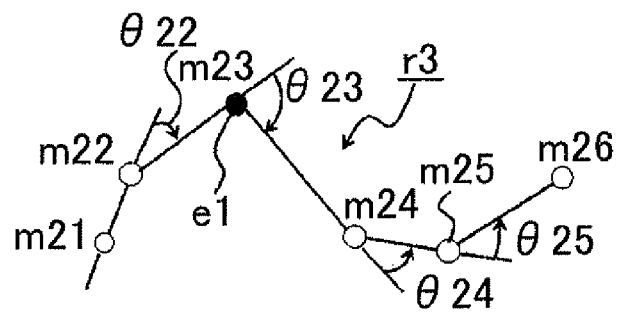
FIG. 9 is a fifth explanatory diagram of the corner detection in the embodiment of FIGS. 1A and 1B.

Further, the candidate start point/candidate end point setting processing unit determines whether the direction angle reverses at a predetermined shape interpolation point. When the direction angle does not reverse at the predetermined shape interpolation point, the unit determines whether or not it reverses at the immediately succeeding shape interpolation point. If the direction angle does not reverse at the predetermined shape interpolation point but does reverse at the immediately succeeding shape interpolation point, the predetermined shape interpolation point is taken as a candidate end point. When shape interpolation points m21 to m26 are set on a shape estimation road r3 having a shape as shown in FIG. 9, direction angles θ22 and θ23 take positive values and direction angles θ24 and θ25 take negative values at the shape interpolation points m22 to m25. That is, the direction angle θ23 remains positive and does not reverse at the shape interpolation point m23, and the direction angle θ24 reverses from positive to negative at the immediately succeeding shape interpolation point m24. Thus, the shape interpolation point m23 is taken as a candidate end point e1.

Figure 10:
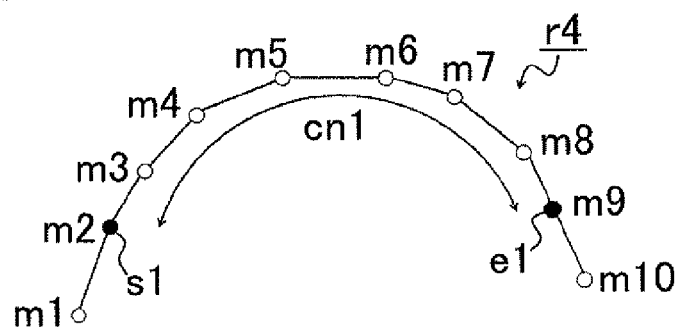
FIG. 10 is a sixth explanatory diagram of the corner detection in the embodiment of FIGS. 1A and 1B.

In this manner, when the candidate start point and the candidate end point are set, a corner setting processing unit of the corner detection processing unit 3113 executes corner setting process, and sets a corner between the candidate start point and the candidate end point. On a shape estimation road r4 having a shape as shown in FIG. 10, a shape interpolation point m2 is selected from among shape interpolation points m1 to m10 as the candidate start point s1, the shape interpolation point m9 is taken as the candidate end point e1, and a corner cn1 between the candidate start point s1 and the candidate end point e1 is set.

Figure 11:
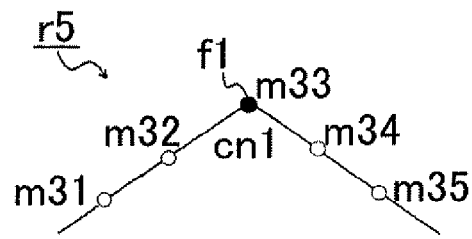
FIG. 11 is a seventh explanatory diagram of the corner detection in the embodiment of FIGS. 1A and 1B.

Note that when the radius of the predetermined shape interpolation point is equal to or smaller than the threshold Rth and both the radius of the immediately preceding shape interpolation point and the radius of the immediately succeeding shape interpolation point are larger than the threshold Rth, the candidate start point/candidate end point setting processing unit sets the predetermined shape interpolation point as a single point combining a candidate start point and a candidate end point, and the corner setting processing unit sets a corner at the predetermined shape interpolation point. On a shape estimation road r5 having a shape as shown in FIG. 11, shape interpolation point m33 is selected from among shape interpolation points m31 to m35 and set as a single point f1, and a corner cn1 is set at the shape interpolation point m33.

Furthermore, when the direction angle reverses between positive and negative at the predetermined shape interpolation point and again at the immediately succeeding shape interpolation point, the candidate start point/candidate end point setting processing unit sets the predetermined shape interpolation point as a single point.

Figure 12:
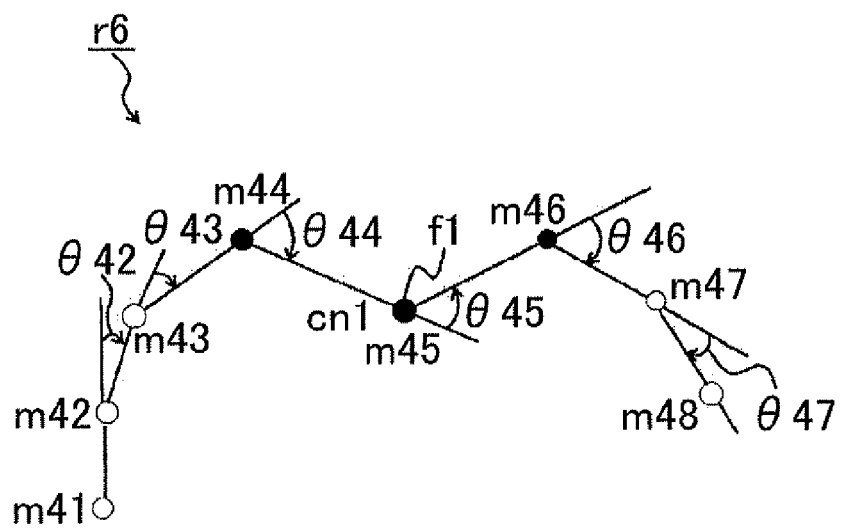
FIG. 12 is an eighth explanatory diagram of the corner detection in the embodiment of FIGS. 1A and 1B.

On a shape estimation road r6 having a shape as shown in FIG. 12, direction angles θ42 to θ44, θ46 and θ47 at shape interpolation points m42 to m44, m46 and m47 have positive values, and a direction angle θ45 at a shape interpolation point m45 has a negative value. In this case, the direction angle θ45 reverses from positive to negative at the shape interpolation point m45, and the direction angle θ46 reverses from negative to positive at the immediately succeeding shape interpolation point m46. Thus, the shape interpolation point m45 is set at a single point f1 and a corner cn1 is set at the shape interpolation point m45. Subsequently, the corner setting processing unit sets three corners cn1 to cn3 before and after the single point f1 and at the single point f1. Note that, in this case, the numbers of the corners are added sequentially from the near side, and the number of a candidate start point and the number of a candidate end point are added corresponding to the numbers of the corners.

Figure 1B:
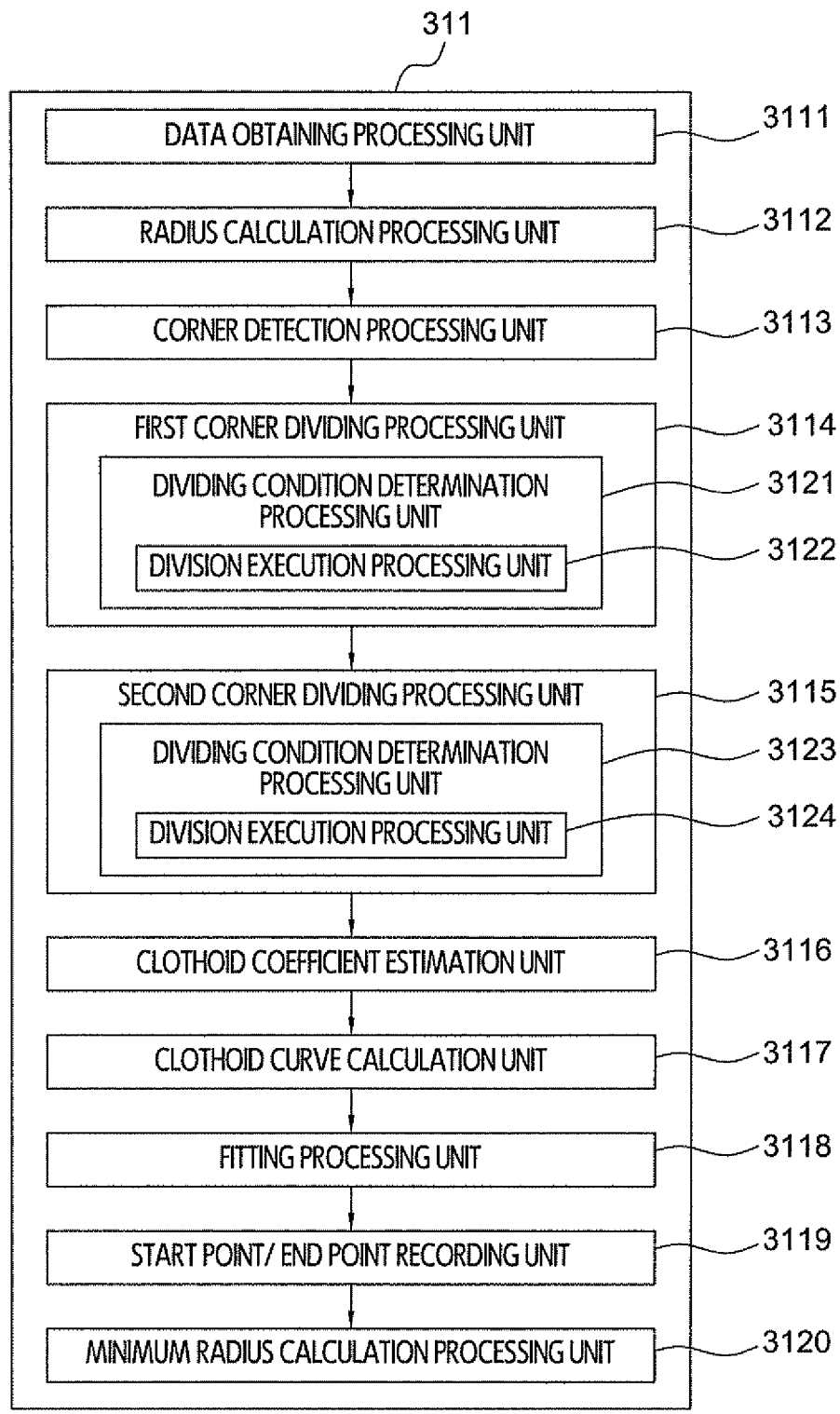
FIG. 1B is a block functional diagram of the CPU of FIG. 11.

In this manner, when a corner is set on a shape estimation road, the recording processing unit of the corner detection processing unit 3113 performs recording processing to record the number of corners in the shape estimation road, the number of a candidate start point, the number of a candidate end point, and so on in the RAM 32 (FIG. 1).

Figure 13:
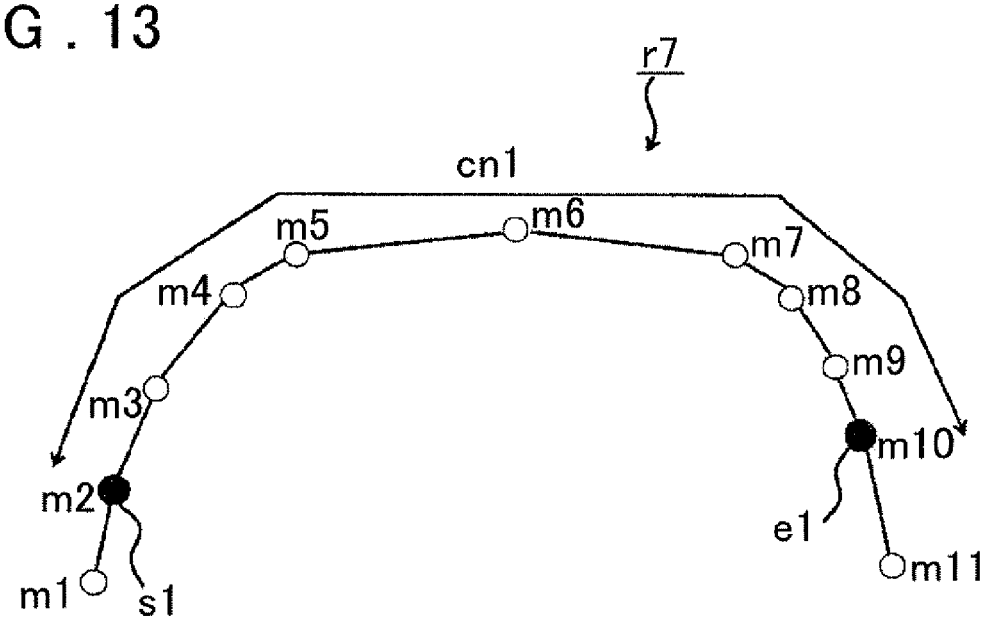
FIG. 13 is a ninth explanatory diagram of the corner detection processing in the embodiment of FIGS. 1A and 1B.

Now, as described above, when precision of the interpolation point data in the database is low and a set predetermined shape interpolation point deviates from a straight line in a straight section of a corner, it is possible that the corner should be regarded as a plurality of corners on the actual road but has been detected as one corner in the database by the corner detection processing unit 3113, and a candidate start point and a candidate end point of one corner are set. For example, on a shape estimation road r7 having a shape close to a trapezoid as shown in FIG. 13, a shape interpolation point m6, which should be set normally on a straight line connecting shape interpolation points m5, m7, is set deviating from the straight line connecting the shape interpolation points m5, m7 between the shape interpolation points m5, m7 that is a straight section.

In this case, radii m2 to R10 at shape interpolation points m2 to m10, calculated in the radius calculation process, are equal to or smaller than the threshold Rth and the direction angles do not reverse between positive and negative at the shape interpolation points m2 to m10. Thus, in the corner detection process, one corner cn1 is detected in the shape interpolation points m2 to m10.

Accordingly, in this embodiment, when corners that should be regarded as a plurality of corners on the actual road are detected as one corner in the database, the detected corner is divided by the first corner dividing processing unit 3114. Next, the subroutine of the first corner dividing processing in step S4 of FIG. 2 will be explained with reference to FIGS. 14-18.

First, a corner information obtaining processing unit (radius basis) of the first corner dividing processing unit 3114 executes a corner information obtaining process to obtain corner information for predetermined corners in a shape estimation road by reading the corner information from the RAM 32. In this case, respective corners existing on the shape estimation road are selected in sequence as predetermined corners.

Note that the corner information includes the numbers of a candidate start point and a candidate end point of each corner recorded in the RAM 32 in addition to the interpolation point data. In this embodiment, the first corner dividing process for the shape estimation road r7 of FIG. 13 is executed. Thus, the corner information obtaining processing unit obtains the number of a corner cn1, the number of a candidate start point s1 of the corner cn1, the number of a candidate end point e1 of the corner cn1, the respective numbers of shape interpolation points m2 to m10, radii R2 to R10 at the respective shape interpolation points m2 to m10, and so on.

Subsequently, a dividing condition determination processing unit (radius basis) 3121 of the first corner dividing processing unit 3114 executes a dividing condition determination process to read the numbers of the shape interpolation points, to calculate the number of shape interpolation points in a corner, and to determine whether or not a first dividing condition for the first corner dividing process is met by whether the number of shape interpolation points is equal to or larger than a threshold, which is three in this embodiment. On the shape estimation road r7 of FIG. 13, the number of shape interpolation points m2 to m10 in the corner cn1 is nine, and thus the first dividing process condition is met.

Figure 15:
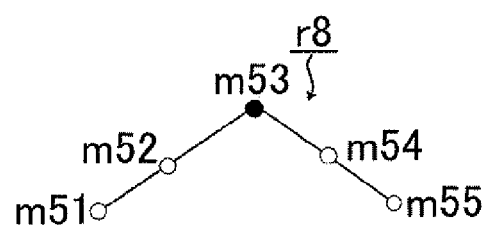
FIG. 15 is a first explanatory diagram of the first corner dividing process in the embodiment of FIGS. 1A and 1B.

For example, in a shape estimation road r8 of FIG. 15, a shape interpolation point m53, alone among shape interpolation points m51 to m55, has a radius equal to or smaller than the threshold and a corner is detected. However, the number of shape interpolation point m53 in the corner is one. Since three or more shape interpolation points are not included in the corner, the first dividing condition is not met. Further, on shape estimation road r9 of FIG. 16, shape interpolation points m63, m64, among shape interpolation points m61 to m66, have radii equal to or smaller than the threshold and a corner is detected, but the number of shape interpolation points m63, m64 in the corner is two. Since three or more shape interpolation points are not included in the corner, the first dividing condition is not met.

Next, the dividing condition determination processing unit 3121 determines whether a radius at a predetermined shape interpolation point in the corner is larger as compared to respective radii at the other shape interpolation points in the corner. For this purpose, the dividing condition determination processing unit reads radii at respective shape interpolation points in the corner, and determines whether or not a second dividing condition is met by whether the predetermined shape interpolation point in the corner has a radius equal to or larger than a threshold for a first dividing condition determination, calculated based on the radii at respective shape interpolation points in the corner, that is, first dividing process threshold Rthcn.

For this purpose, an average radius calculation processing unit of the dividing condition determination processing unit 3121 performs average radius calculation processing to calculate an average value Ra of radii R2 to R10 at respective shape interpolation points m2 to m10. Subsequently a threshold calculation processing unit of the dividing condition determination processing unit 3121 performs threshold calculation processing to set the first dividing threshold Rthcn, when a standard deviation calculated based on the average value Ra is $\sigma 1$, to be $$Rthcn = Ra + 3 \cdot \sigma 1$$

Figure 17:
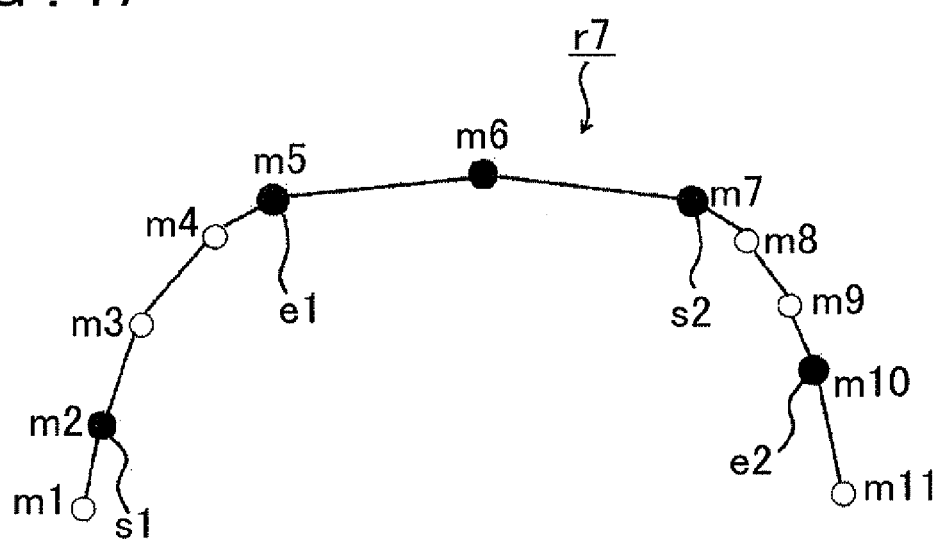
FIG. 17 is a third explanatory diagram of the first corner dividing process in the embodiment of FIGS. 1A and 1B.

On a shape estimation road r7 of FIG. 17, when a shape interpolation point m6 has a radius R6 equal to or larger than the first dividing threshold Rthcn, the second dividing condition is met. Note that the standard deviation $\sigma 1$ is an added value set corresponding to the average value Ra.

Subsequently, when the first, second dividing conditions are met, a division execution processing unit (radius basis) 3122 of the dividing condition determination processing unit 3121 executes division execution processing to divide the corner at a shape interpolation point having a radius equal to or larger than the first dividing threshold Rthcn. Specifically, the division execution processing unit 3122 adds the shape interpolation point immediately preceding the shape interpolation point having a radius equal to or larger than the first dividing threshold Rthcn as a candidate end point, and adds the shape interpolation point immediately succeeding the shape interpolation point having a radius equal to or larger than the first dividing threshold Rthcn as a candidate start point. On the shape estimation road r7 of FIG. 17, the corner is divided at a shape interpolation point m6 having a radius equal to or larger than the first dividing threshold Rthcn. A shape interpolation point m2 is taken as a candidate start point s1, and the shape interpolation point m5 immediately preceding a shape interpolation point m6 is taken as a candidate end point e1. Then the shape interpolation point m7 immediately succeeding the shape interpolation point m6 is taken as a candidate start point s2, and a shape interpolation point m10 is taken as a candidate end point e2.

Figure 18:
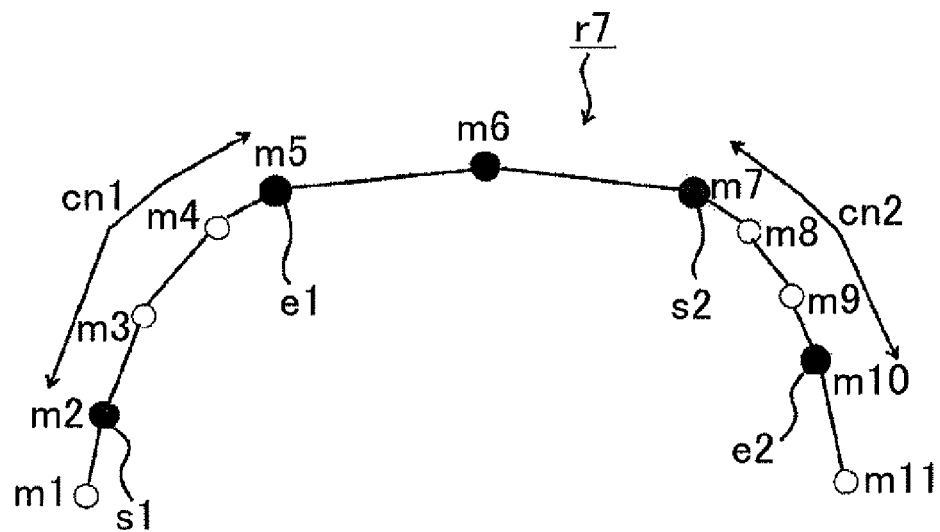
FIG. 18 is a fourth explanatory diagram of the first corner dividing process in the embodiment of FIGS. 1A and 1B.

In this manner, in this embodiment as shown in FIG. 18, a corner cn1 is set by the shape interpolation points m2 to m5 and a corner cn2 is set by the shape interpolation points m7 to m10.

Further, when one of the first and second dividing conditions is not met, the corner division execution processing unit 3122 does not divide the current corner.

Accordingly, in this embodiment, even if precision of the interpolation point data in the database is low and a predetermined shape interpolation point is set deviating from a straight line in a straight section of a corner, dividing of the corner is performed when the first and second dividing conditions are met. Therefore, corners that should be regarded as a plurality of corners on the actual road will not erroneously be regarded as one corner in the database, and thus the road shape can be estimated precisely.

Further, since the first dividing threshold Rthcn is calculated by adding the standard deviation $\sigma 1$ to the average value Ra, it becomes larger as the average value Ra becomes larger or smaller as the average value Ra becomes smaller Thus, even if noise is included in values of the respective radii RC to R10 or the like, it is possible to precisely determine whether or not the second dividing condition is met.

Since the standard deviation $\sigma 1$ represents the degree of variation between the radii R2 to R10 at the respective shape interpolation points m2 to m10 of the corner, the threshold for dividing of the corner to be performed can be changed according to the degree of variation of the radii R2 to R10. Specifically, when the degree of variation between the radii R2 to R10 is high, the first dividing threshold Rthcn is increased, which makes it difficult for the second dividing condition to be met, and thus makes it less likely that the corner will be divided. On the other hand, when the degree of variation between the radii R2 to R10 is low, the first dividing threshold Rthcn may be lowered to make it easier to meet, the second dividing condition, and more likely that the corner will be divided.

Note that in this embodiment, the first dividing threshold Rthcn is calculated by adding the standard deviation $\sigma 1$ to the average value Ra but alternatively, the first dividing threshold Rthcn corresponding to the average value Ra may be set in advance and recorded, for example, in the data recording unit 16. In this case, a radius threshold map as a first threshold map in which the average value Ra and the first dividing threshold Rthcn are correlated is recorded in the ROM 33. In the division execution processing, the division execution processing unit 3122 refers to the radius threshold map to read the first dividing threshold Rthcn corresponding to the average value Ra, compares each of R2 to R10 with the first dividing threshold Rthcn, and divides the corner at a shape interpolation point having a radius equal to or larger than the first dividing threshold Rthcn.

Figure 14:
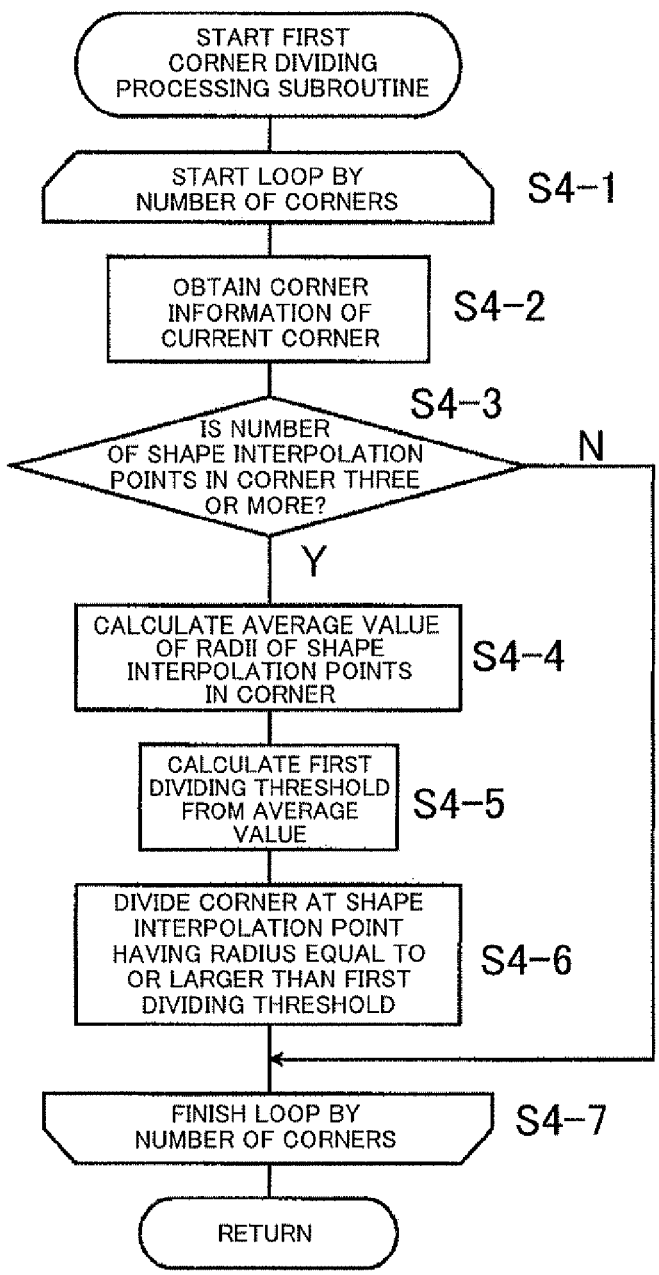
FIG. 14 is a flowchart showing a subroutine of a first corner dividing process in the embodiment of FIGS. 1A and 1B.

Next, the flowchart of FIG. 14 will be explained.

In step S4-1, a loop by the number of corners is started.

In step S4-2, corner information for the current corner is obtained.

In step S4-3, it is determined whether the number of shape interpolation points in the corner is three or more. When the number of shape interpolation points in the corner is three or more, the process proceeds to step S4-4. When the number of shape interpolation points in the corner is smaller than three, the process proceeds to step S4-7.

In step S4-4, the average value of radii of the shape interpolation points in the corner is calculated.

In step S4-5, the first dividing threshold Rthcn is calculated from the average value Ra.

In step S4-6, the corner is divided at a shape interpolation point having a radius equal to or larger than the first dividing threshold Rthcn.

In step S4-7, the loop by the number of corners is finished, and the process is finished.

As described above, when precision of the interpolation point data in the database is low and a shape interpolation point is not set in a straight section of a corner, it is possible that actual plural corners on the road are detected as one corner in the database by the corner detection processing, and a candidate start point and a candidate end point of one corner are determined.

Figure 19:
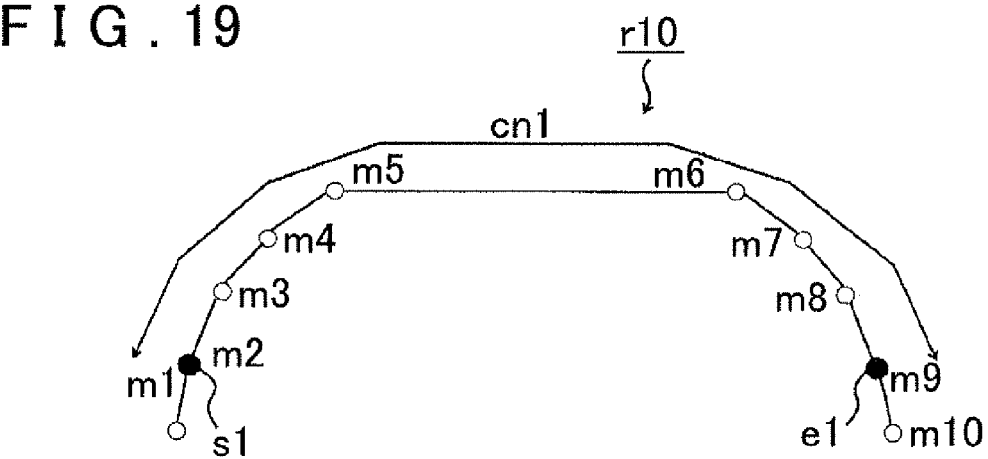
FIG. 19 is a tenth explanatory diagram of the corner detection processing in the embodiment of FIGS. 1A and 1B.

FIG. 19 is a tenth explanatory diagram of the corner detection processing in this preferred embodiment.

In this case, on a shape estimation road r10 having a trapezoidal shape as shown in FIG. 19, a shape interpolation point that should be set is not set in the section between shape interpolation points m5, m6, which is a straight section.

In this case, radii R2 to R9 at shape interpolation points m2 to m9 calculated in the radius calculation processing are equal to or lower than the threshold Rth, and the direction angles do not reverse between positive and negative at the shape interpolation points m2 to m9. Thus, in the corner detection processing, one corner cn1 is detected for the shape interpolation points m2 to m9.

Accordingly, in this embodiment, dividing of the corner is performed by the second corner dividing processing unit 3115.

Next, the subroutine of the second corner dividing processing in step S5 of FIG. 2 will be explained with reference to FIGS. 20-23.

First, a corner information obtaining processing unit (segment length basis) of the second corner dividing processing unit 3115 executes a corner information obtaining process to obtain corner information for predetermined corners in a shape estimation road by reading it from the RAM 32. In this case, respective corners existing on the shape estimation road are selected in sequence as predetermined corners.

Note that the corner information includes the numbers of a candidate start point and a candidate end point of each corner recorded in the RAM 32 besides the interpolation point data. In this embodiment, the second corner dividing processing for a shape estimation road r10 is performed. Thus, the corner information obtaining processing unit obtains the number of a corner cn1, the number of a candidate start point s1 of the corner cn1, the number of a candidate end point e1 of the corner cn1, the respective numbers of shape interpolation points m2 to m9, segment lengths of respective segments between the respective shape interpolation points m2 to m9, and so on.

Subsequently, a dividing condition determination processing unit (segment length basis) 3123 of the second corner dividing processing unit 3115 executes a dividing condition determination process to read the numbers of the shape interpolation points, to calculate the number of shape interpolation points in a corner, and to determine whether or not a first dividing condition for performing a second corner dividing processing is met by whether the number of shape interpolation points is equal to or larger than a threshold, which is three in this embodiment. On the shape estimation road r10 of FIG. 21, the number of shape interpolation points m2 to m9 in the corner cn1 is eight, and thus the first dividing condition is met.

Figure 16:
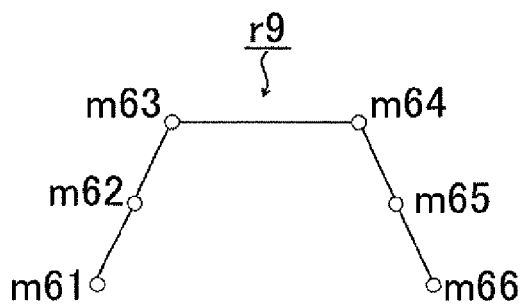
FIG. 16 is a second explanatory diagram of the first corner dividing process in the embodiment of FIGS. 1A and 1B.

For example, as described above, since three or more shape interpolation points are not included in the corners in the shape estimation road r8 of FIG. 15 and the shape estimation road r9 of FIG. 16, the first dividing condition is not met.

Next, the dividing condition determination processing unit 3123 determines whether a segment length between predetermined shape interpolation points in the corner is longer than respective segment lengths between other shape interpolation points in the corner. For this purpose, the dividing condition determination processing unit 3123 reads the segment lengths between respective shape interpolation points in the corner, and determines whether or not a second dividing condition is met by whether segments between predetermined shape interpolation points in the corner have segment lengths equal to or larger than a threshold for a second dividing condition, calculated based on the segment lengths between respective shape interpolation points in the corner, that is, a second dividing threshold Lthcn.

For this purpose, an average segment length calculation processing unit of the dividing condition determination processing unit 3123 executes an average segment length calculation process to calculate an average value La of the segment lengths between the respective shape interpolation points m2 to m9. Subsequently, the threshold calculation processing unit of the dividing condition determination processing unit 3123 executes a threshold calculation to set the second dividing threshold Lthcn, when a standard deviation calculated based on the average value La is σ2, as:

$$Lthcn = La + 3 \cdot \sigma 2$$

Figure 21:
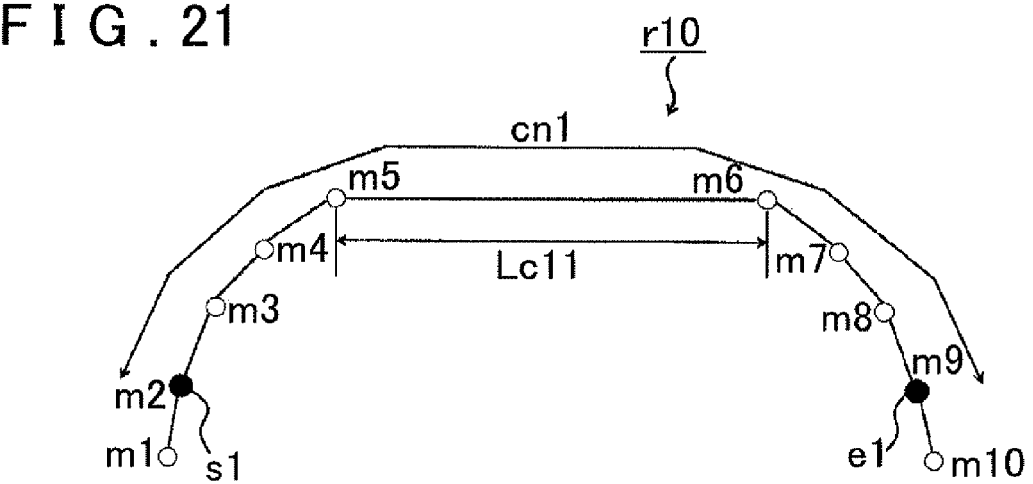
FIG. 21 is a first explanatory diagram of the second corner dividing process in the embodiment of FIGS. 1A and 1B.

In FIG. 21, when the segment Lc1 between the shape interpolation points m5, m6 has a segment length equal to or longer than the second dividing threshold Lthcn, the second dividing condition is met. Note that the standard deviation σ2 is an added value set corresponding to the average value La.

Figure 22:
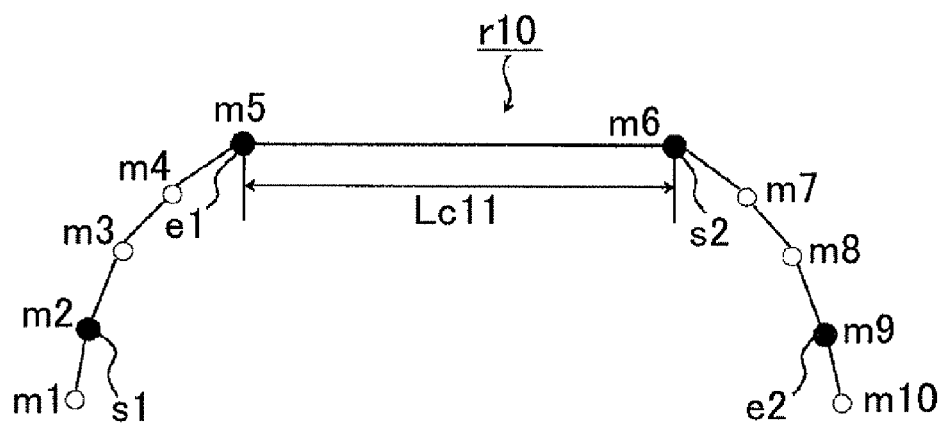
FIG. 22 is a second explanatory diagram of the second corner dividing process in the embodiment of FIGS. 1A and 1B.

Subsequently, when the first and second dividing conditions are met, the division execution processing unit (segment length basis) 3124 of the dividing condition determination processing unit 3123 divides the corner by a segment having a segment length equal to or larger than the second dividing threshold Lthcn. Further, the division execution processing unit 3124 takes the preceding shape interpolation point out of the shape interpolation points forming the segment having a segment length equal to or larger than the second dividing threshold Lthcn as a candidate end point, and takes the succeeding shape interpolation point out of the shape interpolation points forming the segment having a segment length equal to or larger than the second dividing threshold Lthcn as a candidate start point. In FIG. 22, the corner cn1 is divided by the segment between the shape interpolation points m5, m6 having a segment length Lc11 that is equal to or larger than the second dividing threshold Lthcn. A shape interpolation point m2 is taken as a candidate start point s1, the shape interpolation point m5 preceding the segment between the shape interpolation points m5, m6 is taken as a candidate end point e1, the shape interpolation point m6 succeeding the segment between the shape interpolation points m5, m6 is taken as a candidate start point s2, and a shape interpolation point m9 is taken as a candidate end point e2.

Figure 23:
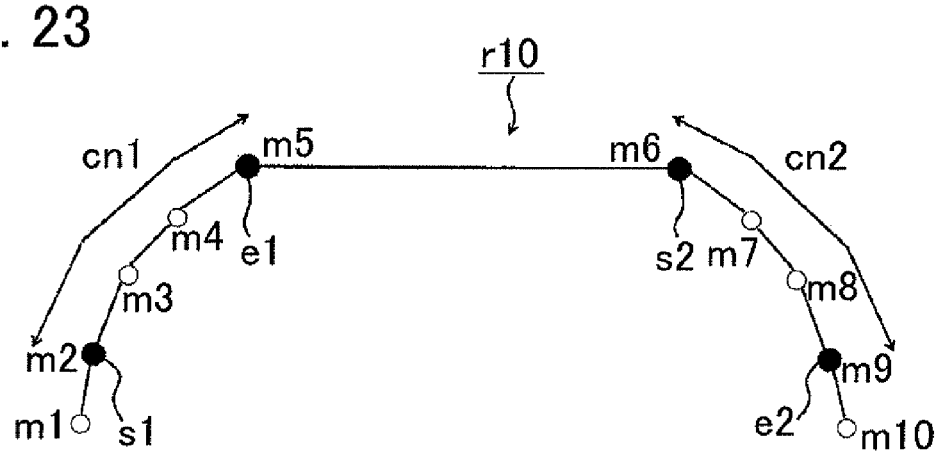
FIG. 23 is a third explanatory diagram of the second corner dividing process in the embodiment of FIGS. 1A and 1B.

In this manner, in this embodiment, as shown in FIG. 23, a corner cn1 is formed by the shape interpolation points m2 to m5, and a corner cn2 is formed by the shape interpolation points m6 to m9.

Further, when one of the first and second dividing conditions is not met, the corner division execution processing unit 3124 does not divide the current corner.

Accordingly, in this embodiment, even if precision of the interpolation point data in the database is low and a shape interpolation point is not set in a straight section of a corner, dividing of the corner is performed when the first and second dividing conditions are met. Therefore, actual plural corners on the road will not be processed as one corner in the database, and thus the road shape can be estimated more precisely.

Further, the second dividing threshold Lthcn is calculated by adding the standard deviation σ2 to the average value La, and it is set larger as the average value La becomes larger or set smaller as the average value La becomes smaller. Thus, even when noise is included in the values of the respective segment lengths, it is possible to precisely determine whether or not the second dividing condition is met.

Since the standard deviation σ2 represents the degree of variation ("dispersion") between the respective segment lengths between the respective shape interpolation points m2 to m9 of the corner, the threshold for dividing the corner can be changed according to the degree of variation between the segment lengths. Specifically, when the degree of variation between the segment lengths is high, the second dividing threshold Lthcn may be increased to make it more difficult for the second dividing condition to be met, thus making it difficult for the corner to be divided. On the other hand, when the degree of variation between the segment lengths is low, the second dividing threshold Lthcn is reduced to make it easier for the second dividing condition to be met, and thus making it more likely that the corner will be divided.

Note that in this embodiment, the second dividing threshold Lthcn is calculated by adding the standard deviation σ2 to the average value La but, alternatively, a second dividing threshold Lthcn that is set in advance corresponding to the average value La can be recorded, for example, in the data recording unit 16.

In this case, a segment length threshold map as a second threshold map, in which the average value La and the second dividing threshold Lthcn are correlated with each other, is recorded in the ROM 33. In the division execution processing, the division execution processing unit 3124 refers to the segment length threshold map to read the second dividing threshold Lthcn corresponding to the average value La, compares the segment lengths between the respective shape interpolation points m2 to m9 with the second dividing threshold Lthcn, and divides the corner by a segment having a segment length equal to or larger than the second dividing threshold Lthcn.

Figure 20:
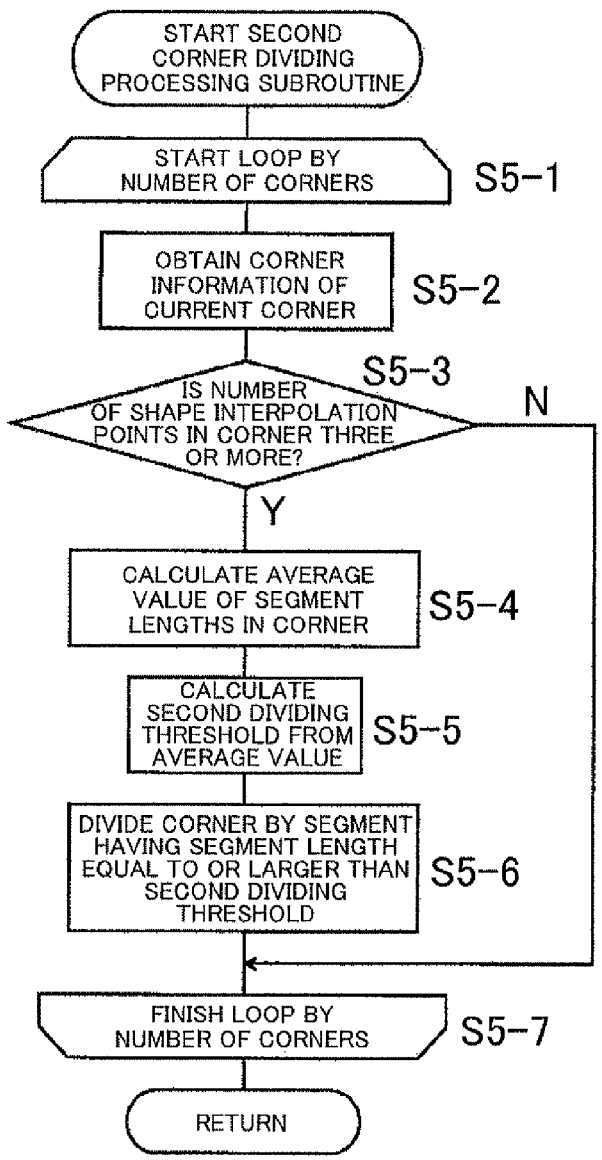
FIG. 20 is a flowchart showing a subroutine of a second corner dividing process in the embodiment of FIGS. 1A and 1B.

Next, the flowchart of FIG. 20 will be explained.

In step S5-1, a loop by the number of corners is started.

In step S5-2, corner information for the current corner is obtained.

In step S5-3, it is determined whether the number of shape interpolation points in the corner is three or more. When the number of shape interpolation points in the corner is three or more, the process proceeds to step 35-4. When the number of shape interpolation points in the corner is smaller than three, the process proceeds to step S5-7.

In step 35-4, the average value La of segment lengths in the corner is calculated.

In step S5-5, the second dividing threshold Lthcn is calculated from the average value La.

In step S5-6, the corner is divided by a segment having a segment length equal to or larger than the second dividing threshold Lthcn.

In step S5-7, the loop by the number of corners is finished, and the process is finished.

Next, the clothoid coefficient estimation processing in step S7 of FIG. 2 will be explained with reference to FIG. 24 which is a clothoid coefficient map (table).

In this case, minimum radii Rmin and square values $A^2$ of the clothoid coefficient A of a clothoid curve are recorded in correlation with each other as a clothoid coefficient map in the ROM 33 (FIG. 1), and the clothoid coefficient estimation unit 3116 reads the minimum radius Rmin calculated in aforementioned step S6, refers to the clothoid coefficient map, and reads the value $A^2$ corresponding to the minimum radius kmin. Subsequently, the clothoid coefficient estimation processing unit 3116 calculates and estimates a clothoid coefficient A. Note that the clothoid coefficient map is created based on a relationship between a radius on the actual road and the clothoid coefficient of a clothoid curve that is used when designing this road.

Next, the subroutine of the clothoid curve calculation processing in step S8 of FIG. 2 will be explained with reference to FIG. 25 which is a flowchart of the subroutine for clothoid curve calculation.

A clothoid curve is a curve having a radius of curvature that becomes smaller with distance from its origin. Generally, when a road is designed, a part of the clothoid curve is assigned to the start point or end point of a corner. To express the clothoid curve by x-y coordinates, when the distance from the start point (origin) of the clothoid curve to a predetermined point S, namely a curve length, is L, and the curve radius at the point S is Rc, the following equation holds true.

$$L \cdot Rc = A^2 \tag{7}$$

Further, normally, the X coordinate and the Y coordinate of the clothoid curve can be calculated by polynomials shown by equations (8) and (9), respectively.

$$X = L \times (1 - L^2/(40Rc^2) + L^4/(3456Rc^4) - L^6/(599040Rc^6) + L^8/(175472640Rc^8) \ldots) \tag{8}$$

$$X = L^2/(6Rc) \times (1 - L^2/(56Rc^2) + L^4/(7040Rc^4) - L^6/(612800Rc^6) + L^8/(588349440Rc^8) \ldots) \tag{9}$$

In this case, it is conceivable to calculate the clothoid curve by the aforementioned equations (8) and (9), but since equations (8) and (9) are high-order polynomials, the load applied to the CPU 31 becomes large in clothoid curve calculation processing when it is attempted to calculate the clothoid curve by plotting a large number of points.

Accordingly, in this embodiment, the clothoid curve is calculated based on the clothoid coefficient A calculated in the clothoid coefficient estimation processing by the clothoid curve calculation unit 3117. Thus, the clothoid curve calculation unit 3117 approximates and calculates the X coordinate and the Y coordinate of the clothoid curve (point S of the curve length L (k)) by equations (10) and (11) obtained based on simulation.

[Equation 1]

$$X = X_0 + \sum_r \cos\phi \tag{10}$$

$$Y = Y_0 + \sum_L \sin\phi \tag{11}$$

Here, $X_0$ and $Y_0$ are the X coordinate and the Y coordinate of a start point of the clothoid curve. Further, angle $\phi$ is expressed by equation (12).

$$\phi = \alpha + 2k \cdot L \tag{12}$$

wherein α is the direction of the start point of the clothoid curve, and value k is expressed by the following equation (13).

$$k = 28/A^2 \qquad (13)$$

Next, the flowchart of FIG. 25 will be explained.

In step S8-1, a loop is started by the curve length L(k) of the clothoid curve.

In step S8-2, the X coordinate of the point S of the curve length L(k) is calculated.

In step S8-3, the Y coordinate of the point S of the curve length L(k) is calculated.

In step S8-4, the loop is finished by the curve length L(k) of the clothoid curve, and the process returns to the main routine.

Next, the fitting processing in step S9 of FIG. 2 will be explained with reference to FIG. 26 which is an explanatory diagram of the fitting process.

In FIG. 26, reference numeral r7 denotes a shape estimation road, reference numeral cn1 denotes a corner set by the corner connection processing and the first and second corner dividing processing, reference numerals m1 to m5 denote shape interpolation points forming the corner cn1, and reference numeral s1 denotes a candidate start point of the corner cn1.

In this case, a clothoid curve movement processing unit of the fitting processing unit 3118 executes a clothoid curve movement process to place the origin Qs of a clothoid curve Q on an extended line of the segment Sg1 connecting the shape interpolation points m1, m2, and to move the clothoid curve Q in the direction of arrow E so that a tangent line on the origin Qs and the extended line of the segment Sg1 correspond.

At this time, an error calculation processing unit of the fitting processing unit 3118 performs error calculation processing to calculate the sum of errors of the position of the clothoid curve Q with respect to the respective shape interpolation points m2 to m5 after the shape interpolation point m2. In this case, the errors of the position of the clothoid curve Q with respect to the respective shape interpolation points m2 to m5 are calculated based on a distance on the X-axis and a distance on the Y-axis between the shape interpolation points m2 to m5 and each point plotted when drawing the clothoid curve Q.

Then the clothoid curve movement processing unit matches the clothoid curve Q with the shape interpolation points m2 to m5 so that the sum of the errors becomes smallest, so as to set the position of the clothoid curve Q.

Subsequently, a start point/end point extraction processing unit of the fitting processing unit 3118 performs start point/end point extraction processing, and set the origin Qs of the clothoid curve Q as a start point Sa1 of the actual corner when the position of the clothoid curve Q is set.

Then the clothoid curve movement processing unit, the error calculation processing unit and the start pointlend point extraction processing unit perform similar processing on the end point side of the corner cn1 so as to set the position of the clothoid curve Q, and then set the origin of the clothoid curve Q as an end point of the actual corner.

In this manner, the candidate start point and the candidate end point are corrected with the clothoid curve Q, and the corrected candidate start point and candidate end point can be set as the start point and end point of the actual corner, respectively. Thus, the candidate start point and the candidate end point of the corner cn1 can be made close to the action start point and end point of a corner.

Next, the start point/end point recording processing in step S10 of FIG. 2 will be explained.

The start point/end point recording unit 3119 records positions of extracted candidate start point and candidate end point as data representing the road shape in the data recording unit 16.

Thus, in this embodiment, a road shape can be estimated precisely, and the start point and the end point of an actual corner are set based on the precisely estimated road shape. Therefore, it is possible to precisely control travel of the vehicle by changing the shift speed of the automatic transmission 10 in accordance with the road shape and/or changing the output of the engine 52 in accordance with the road shape.

In this embodiment, estimation of a road shape is performed by operation of the CPU 31 of the navigation device 14, but it is possible to estimate a road shape by operation of a CPU (not shown) of the automatic transmission control device 11 or by operation of a CPU as a control device of the information center. Note that a vehicle control device operates at a higher level than the automatic transmission control device 11 and the engine control device 51 so as to provide overall control for the entire vehicle, and it is also possible to estimate a road shape by operation of a CPU of this vehicle control device.

Further, in this embodiment, estimation of road shape is performed for a shape estimation road between adjacent nodes, but when a road shape is estimated for every shape estimation road between respective nodes in the case where there is a node in a corner on the actual road, the processing becomes different before and after the node in the corner. Accordingly, in another embodiment, road following data is added between respective road links in the road data, and when a road link that is expected to be entered after passing the node is clear, or when a searched route is set by route search processing, estimation of road shape can be performed for two or more consecutive shape estimation roads.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A road shape estimating device for a vehicle, comprising:
   a position determination device for determining a position of the vehicle;
   a data obtaining processing unit which obtains, from a database in a data recording unit of a navigation device mounted in the vehicle, interpolation point data for a plurality of shape interpolation points which are set along a road, wherein the shape interpolation points and linear segments joining adjacent interpolation points represent a shape of the road;
   a radius calculation processing unit which calculates a radius of curvature at each of the shape interpolation points based on the interpolation point data for a predetermined section of the road;
   a corner detection processing unit which detects a corner in the predetermined section by extracting any shape interpolation point with a radius of curvature equal to or smaller than a first threshold which is set in advance based on the radius of curvature at each of the shape interpolation points and sets the detected corner in the database, the detected corner being represented by a plurality of the shape interpolation points and segments; and a corner dividing processing unit, which calculates an average value of radii of curvature at respective shape interpolation points in the detected corner, which sets a second threshold based on the calculated average value of radii of curvature, which divides, into a plurality of corners, the detected corner at a shape interpolation point having a radius of curvature equal to or larger than the second threshold in the detected corner, wherein each of the plurality of corners is represented by plural shape interpolation points and segments, and which estimates a road shape for a road section in front of the determined vehicle position based on the plurality of corners; and a control device which controls the vehicle in accordance with the estimated road shape of the road section in front of the vehicle.

2. The road shape estimating device according to claim 1, wherein the second threshold is set corresponding to a degree of variation between radii of curvature at respective shape interpolation points in the corner.

3. A road shape estimating method for estimating a road shape for a road section in front of a vehicle, comprising the steps of:

determining a position of the vehicle;

obtaining, from a database in a storage unit, interpolation point data for a plurality of shape interpolation points which are set along a road, wherein the shape interpolation points and linear segments joining adjacent interpolation points represent a shape of a road; and a computer:

calculating a radius of curvature at each of the shape interpolation points based on the interpolation point data for a predetermined section of the road;

detecting a corner in the predetermined section by extracting any shape interpolation point with a radius of curvature equal to or smaller than a first threshold which is set in advance based on the radius of curvature at each of the shape interpolation points and setting the detected corner in the database, the detected corner being represented by a plurality of shape interpolation points and segments;

calculating an average value of radii of curvature at respective shape interpolation points in the detected corner;

setting a second threshold based on the calculated average value of radii of curvature;

dividing the detected corner into a plurality of corners at a shape interpolation point having a radius of curvature equal to or larger than the second threshold in the detected corner, wherein each of the plurality of corners is represented by plural shape interpolation points and segments; and estimating a road shape for the road section in front of the determined position of the vehicle based on the plurality of corners; and controlling an operation of the vehicle in accordance with the estimated road shape.

4. A non-transitory computer-readable medium having, encoded thereon, a program that causes a computer to perform the steps of:

obtaining interpolation point data for a plurality of shape interpolation points which are set along a road, wherein the shape interpolation points and linear segments joining adjacent interpolation points represent a shape of the road;

calculating a radius of curvature at each of the shape interpolation points based on the interpolation point data for a predetermined section of the road;

detecting a corner in the predetermined section by extracting any shape interpolation point with a radius of curvature equal to or smaller than a first threshold which is set in advance based on the radius of curvature at each of the shape interpolation points and setting the detected corner in the database, the detected corner being represented by a plurality of shape interpolation points and segments;

calculating an average value of radii of curvature at respective shape interpolation points in the detected corner;

setting a second threshold based on the calculated average value of radii of curvature; and dividing the detected corner into a plurality of corners at a shape interpolation point having a radius of curvature equal to or larger than the second threshold in the detected corner, wherein each of the plurality of corners is represented by plural shape interpolation points and segments; and estimating a road shape for a road section in front of the vehicle based on the plurality of corners.

* * * * *